(No Model.)
W. DANIELS.
Filter.
No. 242,759. Patented June 14, 1881.
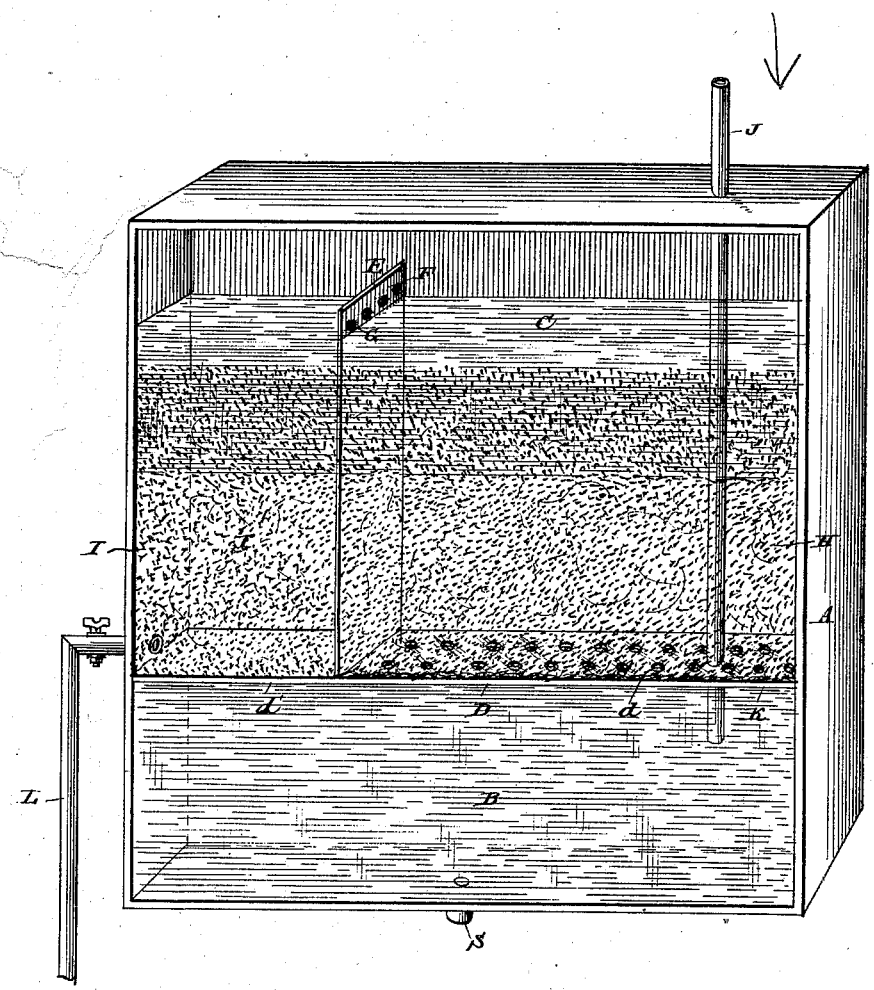
Witnesses:
A. M. Long
A. M. Tanner
Willard Daniels, Inventor
By Paine Crofton & Ladd,
Attorneys.

UNITED STATES PATENT OFFICE.

WILLARD DANIELS, OF BRISTOL, VERMONT, ASSIGNOR TO LAUREN S. SCOTT AND ELIZABETH C. DANIELS, BOTH OF SAME PLACE.

FILTER.

SPECIFICATION forming part of Letters Patent No. 242,759, dated June 14, 1881.

Application filed April 25, 1881. (No model.)

*To all whom it may concern:*

Be it known that I, WILLARD DANIELS, a citizen of the United States, residing at Bristol, in the county of Addison and State of Vermont, have invented certain new and useful Improvements in Filters; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

The present invention relates to that class of filters which are chiefly designed for filtering water prior to its admission into a cistern or reservoir; and the object of the invention is to provide a filter which is more simple in construction and effective in operation than others heretofore devised.

A filter constructed according to my invention comprises a casing which is divided into two superposed chambers by means of a partition-floor. A vertical plate or board rising from said partition-floor terminates near the top of the casing or upper chamber, and has a series of openings at or near its upper edge, which are covered by strainer plates or cloth. The partition-floor has its main portion perforated, so as to permit the water led into the lower chamber to flow into the upper chamber through said perforated floor. The water rises through the filtering material contained in one compartment of the upper chamber, and passes through the gauze-covered openings into the second chamber, where it takes a downward course through the filtering material contained in said chamber, and is conducted into the cistern or other receiver by a discharge-tube located directly above the solid or imperforated portion of the partition-floor.

In the drawing, the figure is a vertical sectional view of a filter constructed according to my invention.

The letter A designates a casing, which is made of wood or other suitable material, and may be of a rectangular or other form. The casing is divided into a bottom chamber, B, and top chamber, C, by means of a partition-floor or diaphragm, D, which is secured to the casing in any suitable manner. A board or plate, E, rising from the partition-floor, and attached thereto and to the sides of the casing, terminates near the top of the upper chamber, and has a series of openings, F, at or near its upper edge. These openings are covered with asbestus cloth, felt, or any other suitable material, G, tending to serve as an effective straining medium. The vertical plate or board E divides the upper chamber into two sub chambers or compartments, H I, one of which is generally wider than the other. These chambers are packed with charcoal and sand, or any of the materials customarily used in filters. It will be obvious that the packing material extends to the bottom of the openings in the vertical partition-plate.

The partition-floor or diaphragm D is made with a perforated portion, $d$, and with a solid or closed portion, $d'$. The perforated part forms the floor of the compartment H, and the solid portion closes the bottom of the compartment I.

A leader or water-delivery pipe, J, passes into the filter-casing and enters the bottom chamber, B; or, if preferred, said pipe may be arranged on the outside of the casing.

An asbestus-cloth or other form of strainer, K, is placed on the perforated portion of the floor D.

The sediment and impurities arrested in the lower chamber are drawn off through a bottom opening closed by means of a plug, S.

The operation of a filter constructed in the above-described manner is as follows, viz: The water admitted into the bottom chamber passes in an upward direction through the perforated floor of the larger compartment of the top chamber, and takes its course through the filtering material contained in said compartment. As the filtering material does not extend to the top edge of the partition-plate, it necessarily follows that the water accumulates on the top of said material and flows through the strainer-openings made in said partition-plate into the second compartment of the top chamber. In this chamber the water flows or percolates through the filtering material in a downward direction, and it is drawn off through the discharge-pipe L, entering the chamber C directly above the floor thereof.

It will be evident without further description that a filter constructed according to my invention possesses all the requisites which will render it cheap, simple, and effective in operation.

What I claim as new, and desire to secure by Letters Patent, is—

The filter herein described, comprising the casing or shell, the partition-floor or diaphragm, having a perforated portion and a solid or closed portion, the vertical partition board or plate rising from the partition-floor, terminating near the top of the casing, and having strainer-openings at its upper edge, the inlet-pipe, and the outlet-pipe, all constructed and relatively arranged for dividing the filter-casing into a bottom inlet-chamber and an upper subdivided chamber containing filtering materials, as herein set forth.

In testimony whereof I affix my signature in presence of two witnesses.

WILLARD DANIELS.

Witnesses:
ERASMUS M. KENT,
EDSON H. YOUNG.